Feb. 2, 1926. Re. 16,257
J. G. P. THOMAS
CLUTCH AND BRAKE CONTROL ON ROAD VEHICLES
Original Filed Oct. 19, 1920
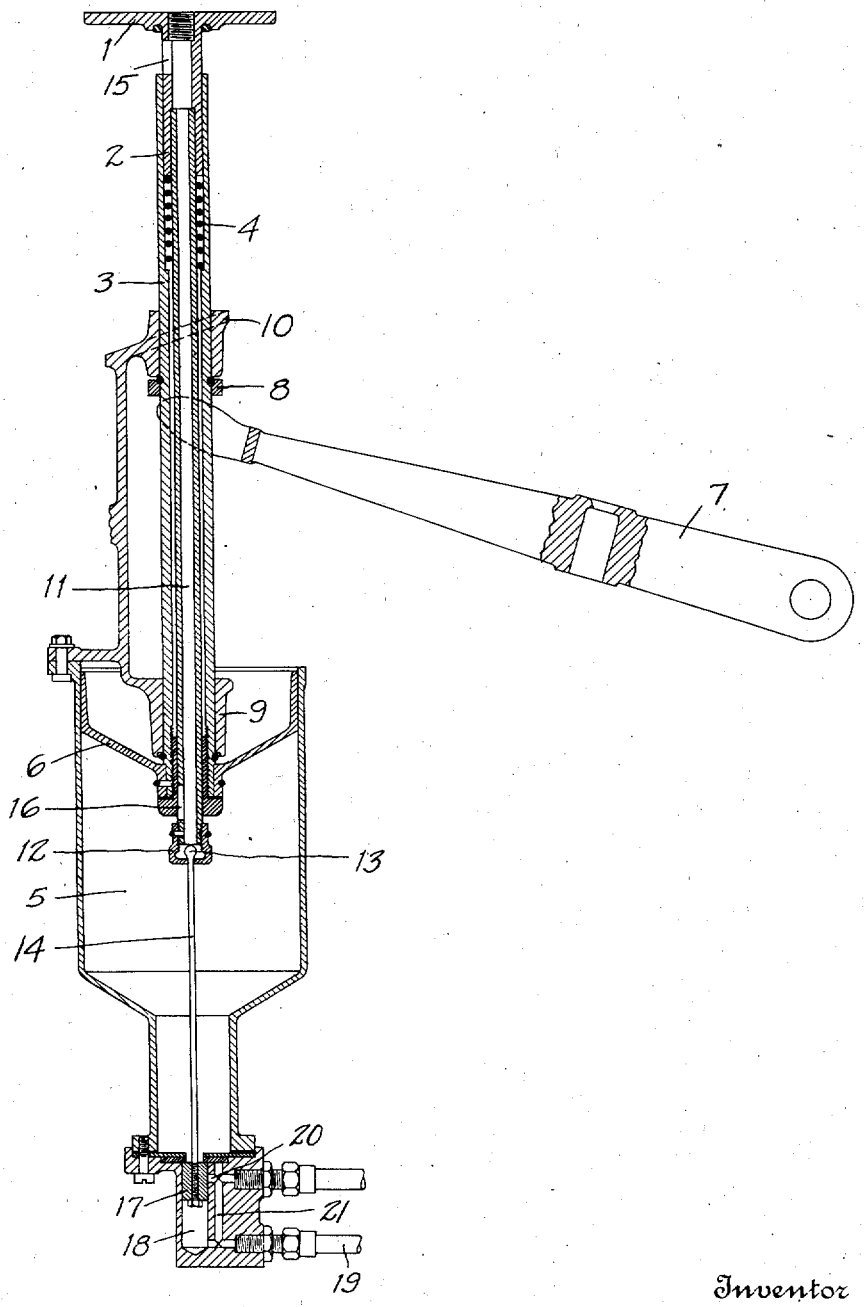
Inventor
JOHN GODFREY PARRY THOMAS
By his Attorneys
Blackmore, Spencer & Flint.

Reissued Feb. 2, 1926. Re. 16,257

UNITED STATES PATENT OFFICE.

JOHN GODFREY PARRY THOMAS, OF PRESTON, ENGLAND, ASSIGNOR TO GENERAL MOTORS CORPORATION, OF DETROIT, MICHIGAN, A CORPORATION OF DELAWARE.

CLUTCH AND BRAKE CONTROL ON ROAD VEHICLES.

Original No. 1,441,545, dated January 9, 1923, Serial No. 417,859, filed October 19, 1920. Application for reissue filed April 12, 1924. Serial No. 706,198.

*To all whom it may concern:*

Be it known that I, JOHN GODFREY PARRY THOMAS, a subject of the King of Great Britain and Ireland, residing at 5 Lathom Street, Preston, Lancashire, England, have invented certain new and useful Improvements in Clutches and Brake Controls on Road Vehicles, of which the following is a full, clear, concise, and exact description, such as will enable others skilled in the art to which the invention relates to make and use the same, reference being made therein to the accompanying drawings, which form a part of this specification.

This invention relates to the operation and control of the brakes and clutches of motor road vehicles. It consists in an apparatus which enables the brake to be applied or the clutch to be engaged by power, the extent of application or engagement being controlled by a pedal or handle of usual form; while in the event of the failure of the power the pedal or handle serves for the application of the brake or clutch by foot or hand in the usual manner.

The invention is hereinafter described in its application to a pedal controlled brake; the substitution of a handle for the pedal, or the application of the invention to a clutch instead of to a brake, will need no separate explanation, the word "pedal" being read as including handle and "brake" as including clutch.

In order that the degree of application of the brake may be controlled by the pedal the power is arranged to be applied upon depression of the pedal, and to be cut off upon the consequent movement of the brake occurring; or in other words the admission of power is dependent on relative or non-corresponding movement of the pedal and brake, that is to say, upon movement of one member which is not accompanied by corresponding movement of the other.

As a prime mover, a device operated by fluid power may be used, a convenient source being the suction pipe of the internal combustion engine by which the road vehicle is propelled, for even when the engine is only turning over light a vacuum of eigh' to ten pounds is available in this pipe. In a preferred construction a power cylinder operated from this source is arranged with its axis in the line of movement of the pedal, which is guided upon the piston rod and can be depressed relatively to it against the action of a spring. Any such depression permits the opening of a valve under spring or fluid pressure, by which the interior of the cylinder is connected with the suction pipe; and a sufficient depression of the pedal relative to the piston rod closes a valve or port through which the interior of the cylinder is open to the atmosphere. The piston rod is interconnected with the brake lever or other brake-operating medium so that its movement, whether under the pressure on the piston or the pressure on the pedal, or both, will cause the application of the brake.

Further details of this preferred construction may be seen from the accompanying drawing which shows it diagrammatically in longitudinal section.

In this figure 1 is the pedal, the stem of which slides within the end of the hollow piston rod 3 against the action of a spring 4 interposed between the stem 2 and a shoulder in the piston rod. The power cylinder is indicated at 5 and its piston at 6. The brake lever 7 has a forked end in position to be engaged by a collar 8 secured upon the piston rod which is guided in a gland 9 and bracket 10 or in other suitable fashion.

It will be apparent that the brake lever 7 will be operated upon movement of the piston rod 3, whether such movement results merely from depression of the pedal after the spring is compressed, or from movement of the piston 6. As usual the brake lever is lifted or the brake pressed into "off" position by a suitable spring, not shown.

There is attached to the stem 2 of the pedal a tubular prolongation 11 which extends completely through the piston rod and piston, and at its end beyond the piston carries a screw cap 12 which attaches to it the enlarged head 13 of a rod 14. This head is small enough to pass freely into the tube 11, so that it is not of necessity pushed down when the pedal is depressed, but is positively pulled up when the cap 12 engages it. In the stem 2 there is formed a port 15, and this ported stem, co-operating with the hollow piston rod 3, constitutes a valve which is closed by a sufficient depression of the pedal 1 relatively to the piston rod. Through this port 15 and through a similar port 16 in the tube 11 and through the tube itself the interior of the cylinder 5 is normally connected with the atmosphere.

The rod 14 is attached to and operates a piston valve consisting of a piston 17 moving in a small cylinder 18. This piston may normally be pressed downward by a spring; but in the construction shown the lower end of the cylinder is permanently connected with the suction pipe of the engine through a pipe 19, so that the suction continually exerted on the piston 17 suffices to pull it down when the cap 12 permits. When sufficiently lowered the piston 17 uncovers a port 20 connected through pipe 21 with the suction pipe of the engine.

The operation of the apparatus is as follows: Initial pressure upon the pedal 1 moves it downward relatively to the piston 3, compressing the spring 4, that spring being weaker than the spring which holds the brake off. Such movement permits the piston 17 to move downwards and to uncover the port 20. The interior of cylinder 5 is then connected with the suction pipe of the engine, but as it is still also connected with the atmosphere through the port 15, air is at first idly drawn through that port and the tube 11, and the brake is not operated. But when the pedal 1 has been sufficiently depressed to bring the port 15 wholly within the piston rod 3, and thereby close it, the suction exerted on the piston 6 pulls it down and through the collar 8 and lever 7 applies the brake. If the pedal 1 is not further depressed the movement of the piston rod 3 will uncover the port 15, whereupon such movement will stop. If the pedal 1 is further depressed the brake lever 7 must move further before the port 15 can again be uncovered. Thus the extent of depression of the pedal governs the extent of application of the brake.

Nevertheless, if for any reason, as through the engine stopping, power should fail, the depression of the pedal will obviously, after the spring 4 is compressed, itself cause movement of the piston rod and therefore of the brake lever 7 under the pressure of the foot. Moreover, if the power applied to the piston is not alone sufficient, as when the engine suction is low or if the piston is not large enough, there will be concurrent manual and power operation, port 15 remaining covered.

While I have shown a suction cylinder and piston as the prime mover, and while certain phases of the invention relate to mechanism suitable for use therewith, the invention in other phases is equally applicable to mechanism operated by prime movers of other sorts. Also while I have shown levers and links as a force transmission between the prime mover and the device operated thereby, and while one feature of the invention relates to the interconnection of the brake pedal with the parts of this transmission between the prime mover and the device which it operates, especially where a preliminary lost motion of the pedal operates means such as a valve controlling the prime mover, equivalent operating media of various kinds are intended to be covered by the claims where they are not specifically limited. Accordingly it is my intention that the scope of the invention be limited only by the terms and language of the appended claims.

I claim:

1. In a motor road vehicle having an internal combustion engine the combination with a control lever, of a cylinder and piston adapted to operate said lever, a control device operable by the driver, a connection between said cylinder and the suction pipe of the engine, and a valve connecting said cylinder with the atmosphere depending on the positions of both said lever and said control device.

2. In a motor road vehicle having an internal combustion engine, the combination of a control lever with a cylinder and piston adapted to operate said lever, a control device operable by the driver, a valve connecting said cylinder with the suction pipe of the engine, a connection between said valve and said control device normally holding said valve closed but permitting it to open upon actuation of said control device, and means causing said valve to open when so permitted.

3. In a motor road vehicle the combination of a control lever with a cylinder, piston and piston rod adapted to operate said lever, a control pedal operable by the driver mounted on and slidable along said piston rod to a limited extent, a spring resisting movement of said pedal along said rod, and means admitting power to said cylinder adapted to be actuated by said pedal.

4. In a motor road vehicle, the combination of a control lever, a control device actuated by the driver, a yielding connection between said device and said lever permitting limited movement of said device without movement of said lever, and a power apparatus for actuating said lever governed by motion of said control device which strains said yielding connection.

5. In a motor road vehicle having an internal combustion engine, the combination with a control lever of a power cylinder operating said lever, a valve connecting said cylinder with the suction pipe of the engine, and a control device actuated by the driver for governing said valve, the control device being connected to operate the lever directly if the power of said cylinder is not sufficient.

6. In a motor road vehicle having an internal combustion engine, a power unit for actuating control apparatus, comprising a cylinder and piston, a valve connecting said cylinder with the suction pipe of the internal combustion engine, a second valve connecting said cylinder with the atmosphere, and a control device operable by the driver for opening the first valve and closing the second.

7. In a motor road vehicle having an internal combustion engine, the combination with a control lever, of a cylinder and piston adapted to operate said lever, a control device operable by the driver, a yielding connection between said device and said lever, permitting the lever to be operated by said device after limited independent movement of the device, a valve connecting said cylinder with the suction pipe of the engine, and a second valve closed by movement of the control device not accompanied by movement of the lever connecting said cylinder with the atmosphere.

8. In a motor road vehicle having an internal combustion engine, the combination of a control lever with a cylinder, piston and hollow piston rod adapted to operate said lever, a control pedal operable by the driver mounted on and slidable along said piston rod and forming therewith a valve connecting said cylinder with the atmosphere, and means connecting said cylinder with the suction pipe of the engine.

9. In a motor road vehicle the combination with a control lever, of a control device for actuation by the driver, a yielding connection between said device and said lever permitting the lever to be operated by said device after limited independent movement of the device, a power apparatus for actuating said lever, and means admitting power to said apparatus depending on the position of both said lever and said control device.

10. In a motor road vehicle having an internal combustion engine, the combination with a control medium, of a cylinder and piston adapted to operate said medium, a control device operable by the driver, a connection between said cylinder and the suction pipe of the engine, and a valve connecting said cylinder with the atmosphere depending both on the position of said control device and on the relative positions of the cylinder and piston.

11. In a motor road vehicle having an internal combustion engine, the combination of a control medium with a cylinder and piston adapted to operate said medium, a control device operable by the driver, a valve connecting said cylinder with the suction pipe of the engine, a connection between said valve and said control device normally holding said valve closed but permitting it to open upon actuation of said control device, and means causing said valve to open when so permitted.

12. In a motor road vehicle having an internal combustion engine, the combination of a control medium with a cylinder and piston adapted to operate said medium, a control device operable by the driver, a valve connecting said cylinder with a source of fluid power, a connection between said valve and said control device normally holding said valve closed but permitting it to open upon actuation of said control device, and means causing said valve to open when so permitted.

13. In a motor road vehicle, in combination, a brake-applying medium, fluid power means for operating said medium, a valve controlling said fluid power means, a brake pedal arranged to operate the valve and also arranged to operate said medium directly, and mechanism whereby both said fluid power means and said brake pedal may act upon said brake applying medium at one and the same time.

14. In a motor road vehicle, in combination, a brake-applying medium, fluid power means for operating said medium, a valve controlling said fluid power means, and a brake pedal arranged to open the valve and to operate said medium directly, the valve and pedal being arranged to permit both manual and fluid power to be applied to the brake-applying medium at the same time.

15. In a motor road vehicle, in combination, a brake-applying lever, fluid power means for operating the lever, a valve controlling said fluid power means and a brake pedal arranged to operate the valve and directly to engage the brake-applying lever to apply additional power thereto manually.

16. In a motor road vehicle having an internal combustion engine, the combination with a brake-applying lever, of a cylinder and piston for operating the lever, a valve connecting the cylinder with the suction pipe of the engine, a brake pedal arranged to operate the valve and directly to engage the brake-applying lever to apply manual power thereto, and mechanism whereby both said piston and said brake pedal may act upon said brake applying lever at one and the same time.

17. In a motor road vehicle having an internal combustion engine the combination, with a brake-applying medium, of a cylinder and piston for operating said medium, a valve connecting said cylinder to the suction pipe of the engine, and a valve-controlling pedal operable by the driver, the extent of depression of the pedal governing the extent of application of the brake.

18. In a motor road vehicle having an internal combustion engine the combination, with a brake-applying medium, of a cylinder and piston for operating said medium, a valve connecting said cylinder to the suction pipe of the engine, and a valve-controlling pedal operable by the driver, the extent of depression of the pedal governing the amount of power applied to said medium.

19. In a motor road vehicle having an internal combustion engine, the combination with a control medium, of a device operated by the power of the engine and connected to the control medium, and a manually-operated member arranged between the power device and the control medium to operate the control medium manually and also arranged to control the power device to provide manually-controlled power operation of the control medium.

20. In a motor road vehicle having an internal combustion engine, the combination with a control medium, of a fluid-power cylinder and piston operated by power derived from the engine through the agency of a power fluid, a transmission from the cylinder and piston to the control medium, a manually-operated member connected in said transmission between the cylinder and piston and the control medium, and a valve controlling the flow of power fluid to and from said cylinder and which is operated by said member.

21. The combination of a device to be actuated, with fluid-pressure power means, a force transmission between said device and means, a pedal having lost-motion connection with said transmission, and a valve controlling said fluid-pressure means and which is operated by lost-motion movement of the pedal in such a manner that manual operation of said device begins after the valve is fully open.

22. A motor vehicle comprising in combination, vehicle-controlling mechanism, a prime mover, a manually-operated member movable in unison with the moving member of the prime mover, a force transmission between the prime mover and the vehicle-controlling mechanism, means for controlling energization of the prime mover, a device moved by the manually-operated member but capable of movement with respect thereto, a connection from said device operating said means in response to relative movement between said device and the manually-operated member, and means urging the device to its inoperative position with respect to the manually-operated member.

23. The combination of a device to be actuated with a prime mover and a manually-operated member movable in unison with a moving member of the prime mover, together with a force transmission between the prime mover and said device, means for controlling the energization of the prime mover, and a control device yieldingly moved by the manually-operated member and arranged to operate said means by resistance to its yielding movement so that the prime mover is not energized when the control device is in its initial position with respect to the manually-operated member and is energized when the control device yields with respect to the manually-operated member.

In testimony whereof I affix my signature.

J. G. P. THOMAS.